(12) United States Patent
Eiler et al.

(10) Patent No.: US 6,837,038 B2
(45) Date of Patent: Jan. 4, 2005

(54) VARIABLE CYCLE BOOST PROPULSOR

(75) Inventors: Donald C. Eiler, Portland, CT (US);
Michael J. Larkin, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 134 days.

(21) Appl. No.: 10/271,695

(22) Filed: Oct. 15, 2002

(65) Prior Publication Data

US 2003/0070418 A1 Apr. 17, 2003

Related U.S. Application Data

(60) Provisional application No. 60/329,925, filed on Oct. 16, 2001.

(51) Int. Cl.[7] .................................................. F02K 3/02
(52) U.S. Cl. ........................ 60/226.1; 60/226.3; 60/229; 239/265.17
(58) Field of Search .............................. 60/226.1, 229, 60/232, 262, 263, 226.3, 228, 230, 225, 244, 264, 791, 771; 239/265.17, 265.29, 265.27

(56) References Cited

U.S. PATENT DOCUMENTS

| | | | | |
|---|---|---|---|---|
| 2,612,020 A | * | 9/1952 | Griffith | 60/39.183 |
| 3,290,963 A | * | 12/1966 | Oldfield et al. | 74/665 M |
| 3,442,082 A | * | 5/1969 | Peterson | 60/224 |
| 3,867,813 A | * | 2/1975 | Leibach | 60/225 |
| 4,112,677 A | * | 9/1978 | Kasmarik | 60/226.1 |
| 5,123,239 A | * | 6/1992 | Rodgers | 60/778 |
| 5,285,626 A | * | 2/1994 | Leeson | 60/778 |
| 6,134,876 A | * | 10/2000 | Hines et al. | 60/791 |
| 6,412,269 B1 | * | 7/2002 | Hines et al. | 60/779 |
| 6,415,597 B1 | * | 7/2002 | Futamura et al. | 60/224 |

* cited by examiner

*Primary Examiner*—Cheryl J. Tyler
*Assistant Examiner*—William H. Rodriguez
(74) *Attorney, Agent, or Firm*—Bachman & LaPointe, P.C.

(57) ABSTRACT

The present invention relates to a variable cycle boost propulsor system for use on an aircraft. The variable cycle boost propulsor system includes an engine, a turbine, a fan connected to the turbine, and a valve system for delivering the fluid output from the engine to the turbine for driving the turbine and the fan and thereby generating additional thrust for the aircraft. The engine is also used to provide power to one or more systems onboard the aircraft.

18 Claims, 2 Drawing Sheets

VARIABLE CYCLE BOOST PROPULSOR

CROSS-REFERENCE TO RELATED APPLICATION(S)

The present application hereby claims the benefit of U.S. Provisional Patent Application Ser. No. 60/329,925, filed Oct. 16, 2001, entitled VARIABLE CYCLE BOOST PROPULSOR.

BACKGROUND OF THE INVENTION

The present invention relates to a system for selectively providing power to aircraft systems and additional thrust at various flight conditions.

Auxiliary power units are used on aircraft as a power source to run aircraft systems and to start the aircraft's engines. The auxiliary power units are also used as an emergency power source in the event of an engine failure. Conventional auxiliary power units however do not selectively provide thrust during flight portions such as take-off and climb.

There remains a need for a system which can both provide power to aircraft systems and provide thrust during portions of the aircraft's flight.

SUMMARY OF THE INVENTION

Accordingly, it is an object of the present invention to provide a system which can provide power to aircraft systems and which can selectively deliver thrust when needed.

It is a further object of the present invention to provide a system as above which would allow the main engines on an aircraft to be reduced in size.

The foregoing objects are attained by the variable boost cycle propulsor system of the present invention.

In accordance with the present invention, a variable boost cycle propulsor system is provided. The system includes an engine, preferably embedded within an aircraft fuselage, a turbine, a fan connected to the turbine, and means for selectively delivering a fluid output from the engine to the turbine to drive the turbine and the fan and thereby deliver thrust to the aircraft during take-off and flight. The engine is also preferably used to supply power to drive one or more aircraft systems.

Other details of the variable cycle propulsor system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
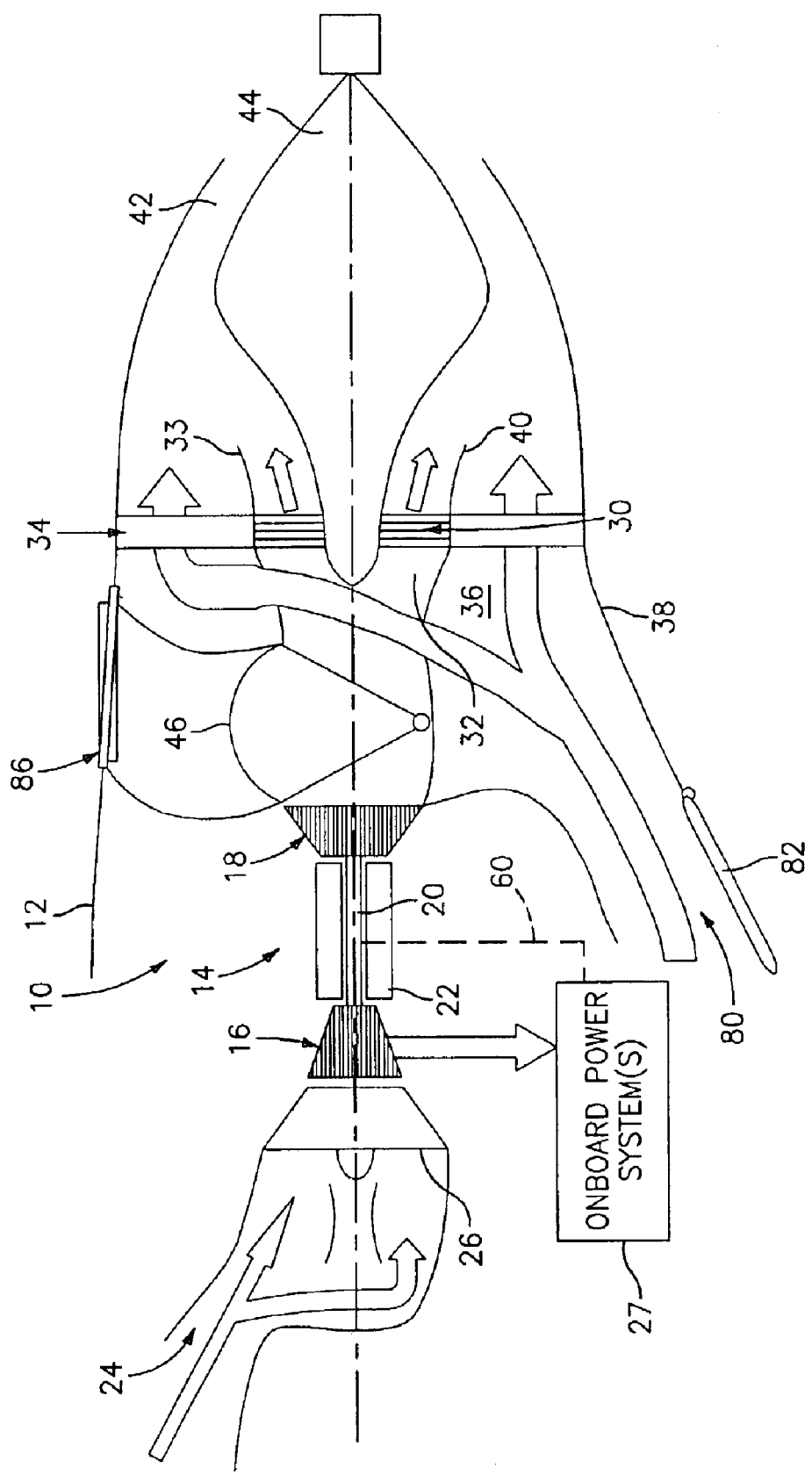
FIG. 1 is a sectional view of a variable cycle boost propulsor system in a boost thrust delivery mode.
Figure 2:
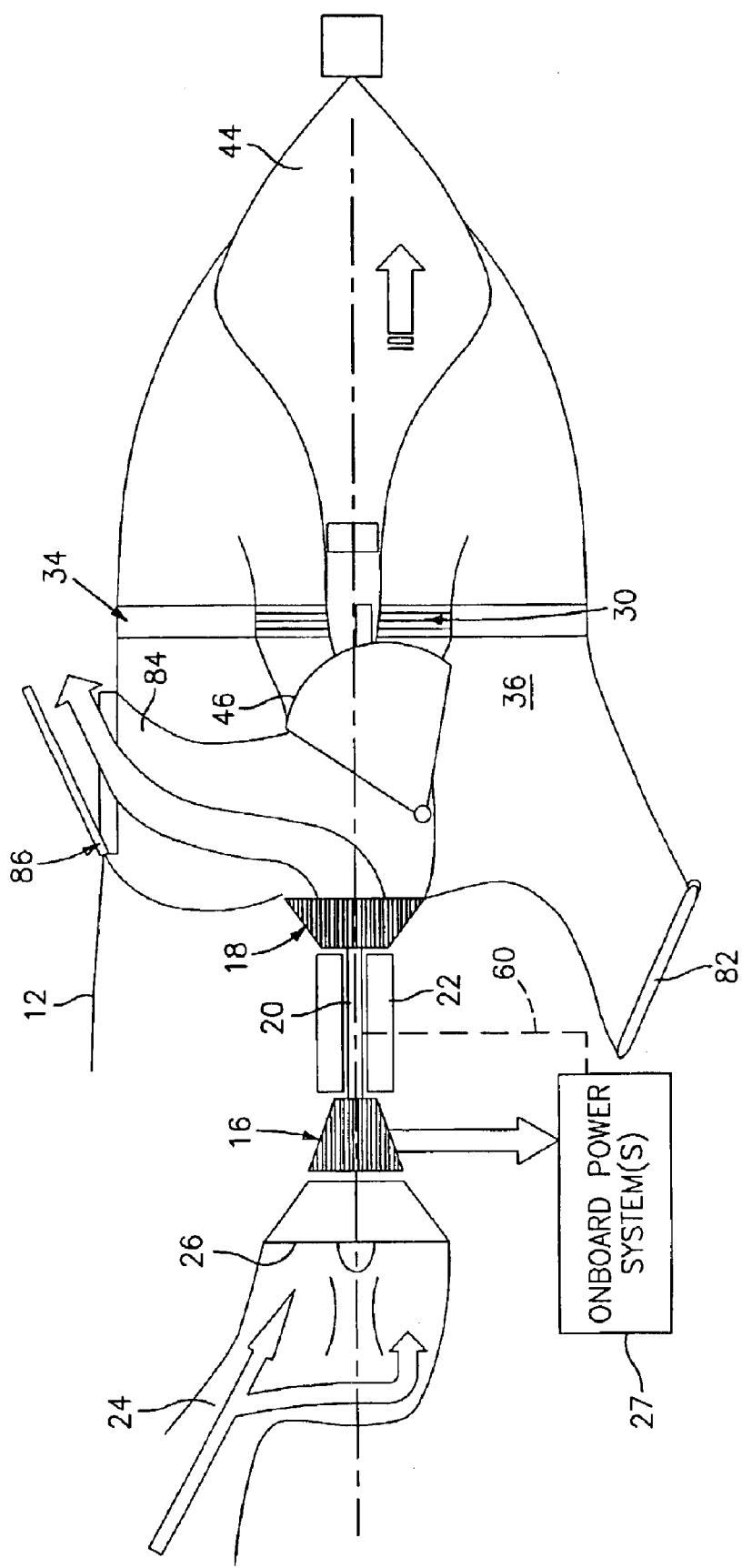
FIG. 2 is a sectional view of the variable cycle boost propulsor system of FIG. 1 in a non-boost thrust delivery mode.

Referring to FIGS. 1 and 2, the variable cycle boost propulsor system 10 may be positioned within an aircraft fuselage 12, such as in the tail portion of the aircraft. The system 10 includes a core engine 14 which includes a compressor 16, a turbine 18 connected to the compressor 16 by a shaft 20, and a burner 22 for burning fuel and increasing the temperature and the pressure of the air exiting the compressor 16. An air inlet passageway 24 formed within the fuselage 12 delivers air to the inlet 26 of the core engine 14.

Power is supplied from the core engine 14 to drive one or more aircraft systems 27 such as an aircraft mounted accessory drive (AMAD) or an engine mounted accessory drive (EMAD). The power may be supplied in the form of shaft power or in the form of pneumatic power. When the power is supplied in the form of shaft power, mechanical connections 60, such as a shaft and gear arrangement, take power off the shaft 20 connected to the compressor 16 and deliver it to the system(s) 27 to be driven. When the power is supplied in pneumatic form, air is bled from the compressor 16 and delivered to a turbine (not shown) connected to the system(s) 27 for driving the system(s) 27.

The system 10 further has a free turbine 30 rotatably mounted in a passageway 32 formed within a core casing 33. The passageway 32 extends from the exit of the engine 14 to the inlet of the free turbine 30. A fan 34 is connected to the free turbine 30. The fan 34 rotates within a bypass passageway 36 formed between an inner surface 38 of the fuselage 12 and an outer surface 40 of the core casing 33. The passageway 32 and the bypass passageway 36 merge to form an exit nozzle 42. An axially movable variable plug 44 is provided to close the exit nozzle 42 when the system 10 is in a non-boost thrust mode.

An inlet 80 is provided in the fuselage 12 to deliver air to the bypass passageway 36 when the system 10 is in a boost thrust mode. An inlet flap 82 is rotatably connected to the fuselage 12 and movable between an open position (FIG. 1) where air can flow through the inlet 80 and a closed position (FIG. 2) where air is unable to enter the inlet 80.

A rotatable gate valve 46 is positioned within the passageway 32. The gate valve 46 moves between a first position (FIG. 2) where the fluid output or exhaust of the core engine 14 is directed overboard via an outlet nozzle 84 and a second position (FIG. 1) where the fluid output is directed to the free turbine 30.

When the gate valve 46 is in the second position, the fluid output or exhaust of the core engine 14 is delivered to the free turbine 30. The fluid output drives the free turbine 30 causing the fan 34 to rotate and create a propulsive or thrust force. After flowing through or exiting the free turbine 30, the fluid output of the core engine 14 merges with the fluid flow being created by the fan 34, thus adding to the thrust which is developed by the system 10.

When the gate valve 46 is in its first position, the gate valve 46 blocks the flow of the output fluid to the free turbine 30. As a result, the free turbine 30 and the fan 34 are no longer driven. Movement of the gate valve 46 to the first position causes a plate 86, which normally closes the outlet nozzle 84, to open. The gate valve 46 then directs the fluid output of the core engine 14 overboard through the open outlet nozzle 84. As can be seen from FIG. 2, when the gate valve 46 is in its first position, the plug 44 is in a nozzle closed position and the inlet flap 82 is in its closed position. Any suitable means (not shown) known in the art may be used to link movement of the gate valve 46 to the plate 86.

As can be seen from the foregoing description, the variable cycle boost propulsor system of the present invention provides power for driving one or more onboard aircraft systems, while also providing additional thrust during key times during the flight of the aircraft, such as take-off and climb out.

While it is preferred to locate the variable cycle boost propulsor system 10 of the present invention within the aircraft fuselage 12, it is possible to locate the system 10 in other portions of the aircraft.

It is apparent that there has been provided in accordance with the present invention a variable cycle boost propulsor which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A variable boost cycle propulsor system for a vehicle comprising:
   an engine;
   a turbine mounted within a casing;
   a bypass passageway formed between an inner surface of a fuselage of said vehicle and an outer surface of said casing;
   a fan driven by said turbine, said fan being positioned within said bypass passageway; and
   means for selectively delivering a fluid output from said engine to said turbine for selectively creating thrust.

2. The variable boost cycle propulsor system according to claim 1, further comprising said engine being embedded within said fuselage of said vehicle and an air inlet passageway within said fuselage to deliver air to an inlet of said engine.

3. The variable boost cycle propulsor system according to claim 1, further comprising means for delivering air to said bypass passageway when said system is in a boost thrust mode.

4. The variable boost cycle propulsor system according to claim 1, wherein said selective delivery means comprises a passageway for delivering said fluid output from said engine to said turbine and a valve positioned within said passageway and said valve being movable between a first position where said fluid output is directed overboard via an outlet nozzle and a second position where the fluid output is directed to the turbine so as to rotate said fan and create a propulsive force.

5. The variable boost cycle propulsor system according to claim 4, wherein said valve is a rotatable gate valve.

6. The variable boost cycle propulsor system according to claim 4, wherein fluid exiting said fan mixes with said fluid output of said engine in an exit nozzle to create a propulsive force.

7. The variable boost cycle propulsor system according to claim 1, further comprising means for supplying power from said engine to at least one aircraft system.

8. The variable boost cycle propulsor system according to claim 7, wherein said engine has a compressor, a turbine, and a shaft connecting said compressor and said turbine and said power supplying means comprises a mechanical connection for taking power off said shaft and delivering said power to said at least one aircraft system.

9. The variable boost cycle propulsor system according to claim 7, wherein said engine has a compressor and said power supplying means comprises pneumatic power supplying means.

10. A variable boost cycle propulsor system for a vehicle comprising:
    an engine;
    a turbine;
    a fan driven by said turbine;
    means for selectively delivering a fluid output from said engine to said turbine for selectively creating thrust;
    a bypass passageway formed between an inner surface of said fuselage and an outer surface of said casing and said fan being positioned within said bypass passageway; and
    said bypass passageway communicating with an exit nozzle and an axially movable plug for closing said exit nozzle when said system is in a non-boost thrust mode.

11. A variable boost cycle propulsor system for a vehicle comprising:
    and engine;
    a turbine;
    a fan driven by said turbine;
    means for selectively delivering a fluid output from said engine to said turbine for selectively creating thrust;
    means for delivering air to said bypass passageway when said system is in a boost thrust model and
    said air delivering means comprising an air inlet in said fuselage and an inlet flap connected to said fuselage and movable between an open position and a closed position.

12. An aircraft having a fuselage and a variable boost cycle propulsor system embedded within a portion of said fuselage, and said variable boost cycle propulsor system including an engine embedded within said fuselage, a turbine embedded within said fuselage and being located within a casing, a bypass passageway between an inner surface of said fuselage and an outer surface of said casing, a fan connected to said turbine, said fan being positioned within said bypass passageway, and means for delivering a fluid output from said engine to drive said turbine and said fan and thereby create additional thrust for said aircraft.

13. An aircraft according to claim 12, wherein said variable boost cycle propulsor system is embedded within a tail portion of said fuselage.

14. An aircraft according to claim 12, wherein said fluid output delivering means includes a fluid passageway extending between said engine and said turbine and a valve within said fluid passageway movable between a first position where said fluid output is delivered to said turbine and a second position where said fluid output is exhausted overboard.

15. An aircraft according to claim 12, further comprising means for delivering air to said bypass passageway.

16. An aircraft according to claim 12, further comprising an exit nozzle for receiving fluid exiting the fan and fluid exiting the turbine.

17. An aircraft having a variable boost cycle propulsor system embedded within a portion of said fuselage, and said variable boost cycle propulsor system including an engine embedded within said fuselage, a turbine embedded within said fuselage, a fan connected to said turbine, means for delivering a fluid output from said engine to drive said turbine and said fan and thereby create additional thrust for said aircraft, said fluid output delivering means including a fluid passageway extending between said engine and said turbine, a valve within said fluid passageway movable between a first position where said fluid output is delivered to said turbine and a second position where said fluid output is exhausted overboard, said turbine being positioned within a casing, a bypass passageway between an inner surface of said fuselage and an outer surface of said casing, said fan being positioned within said bypass passageway, an exit nozzle communicating with said bypass passageway and an axially movable plug for closing said exit nozzle when said variable boost cycle propulsor system is in a non-boost mode.

18. An aircraft having a variable boost cycle propulsor system embedded within a portion of said fuselage, and said variable boost cycle propulsor system including an engine embedded within said fuselage, a turbine embedded within said fuselage, a fan connected to said turbine, means for delivering a fluid output from said engine to drive said turbine and said fan and thereby create additional thrust for said aircraft, said fluid output delivering means including a fluid passageway extending between said engine and said turbine, a valve within said fluid passageway movable between a first position where said fluid output is delivered to said turbine and a second position where said fluid output is exhausted overboard, said turbine being positioned within a casing, a bypass passageway between an inner surface of said fuselage and an outer surface of said casing, said fan being positioned within said bypass passageway, means for delivering air to said bypass passageway, said air delivering means comprises an inlet in said fuselage and a flap movable between a first position where air is introduced into said inlet and a second position for preventing air from entering said bypass passageway.

* * * * *